(12) United States Patent
Ji et al.

(10) Patent No.: US 11,177,561 B2
(45) Date of Patent: Nov. 16, 2021

(54) PROTECTED RFID ANTENNA

(71) Applicant: CHECKPOINT SYSTEMS, INC., Thorofare, NJ (US)

(72) Inventors: Zhonghe Ji, Wilmington, DE (US); Takeshi Matsumoto, Kanagawa (JP)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 133 days.

(21) Appl. No.: 14/985,921

(22) Filed: Dec. 31, 2015

(65) Prior Publication Data

US 2016/0118714 A1 Apr. 28, 2016

Related U.S. Application Data

(63) Continuation-in-part of application No. 14/495,359, filed on Sep. 24, 2014, now Pat. No. 9,299,586.

(51) Int. Cl.
| | |
|---|---|
| *H01L 21/00* | (2006.01) |
| *H01Q 1/38* | (2006.01) |
| *G06K 19/077* | (2006.01) |
| *G08B 13/24* | (2006.01) |
| *G06K 19/07* | (2006.01) |

(52) U.S. Cl.
CPC ........... *H01Q 1/38* (2013.01); *G06K 19/0724* (2013.01); *G06K 19/07767* (2013.01); *G06K 19/07775* (2013.01); *G08B 13/2437* (2013.01)

(58) Field of Classification Search
CPC ......... G06K 19/0724; G06K 19/07767; G06K 19/07775; G08B 13/2437
See application file for complete search history.

(56) References Cited

U.S. PATENT DOCUMENTS

| | | | |
|---|---|---|---|
| 5,716,753 A * | 2/1998 | Yoshimoto | ............ G03F 7/0226 |
| | | | 430/165 |
| 5,939,984 A | 8/1999 | Brady et al. | |
| 6,154,137 A | 11/2000 | Goff et al. | |
| 7,109,867 B2 | 9/2006 | Forster | |
| 7,804,407 B2 | 9/2010 | Copeland | |
| 7,804,410 B2 | 9/2010 | Copeland | |
| 7,804,411 B2 | 9/2010 | Copeland | |
| 7,812,729 B2 | 10/2010 | Copeland | |
| 8,026,818 B2 | 9/2011 | Cote et al. | |
| 8,093,996 B2 | 1/2012 | Heurtier | |
| 8,633,821 B2 | 1/2014 | Forster | |

(Continued)

FOREIGN PATENT DOCUMENTS

| | | |
|---|---|---|
| EP | 2096582 | 9/2009 |
| FR | 2901041 | 11/2007 |

*Primary Examiner* — Richard A Booth
(74) *Attorney, Agent, or Firm* — McDonald Hopkins LLC

(57) ABSTRACT

In one embodiment, a method of manufacturing an RFID label includes providing a web structure comprising a dielectric layer and a metal layer; depositing a non-removable resist on the metal layer, the deposition of the non-removable resist defining an antenna; depositing a removable resist on the metal layer, the deposition of the removable resist defining connection pads for connecting an integrated circuit (IC) to the antenna; etching the metal layer to form the antenna and the connection pads; removing the removable resist from the metal layer to expose the connection pads; and attaching the IC to the connection pads.

6 Claims, 6 Drawing Sheets

(56) References Cited

U.S. PATENT DOCUMENTS

2005/0148121 A1* 7/2005 Yamazaki .......... G06K 19/0704
438/149
2007/0159339 A1* 7/2007 Matsuura ......... G06K 19/07749
340/572.8

* cited by examiner

PROTECTED RFID ANTENNA

CROSS REFERENCE TO RELATED APPLICATIONS

The present application is a continuation in part of U.S. patent application Ser. No. 14/495,359, filed Sep. 24, 2014, the entirety of which is incorporated herein by reference.

BACKGROUND

Radio frequency identification (RFID) technology is increasingly used to identify and track objects. RFID systems can use an RFID label configured to communicate with an RFID interrogator. There are several methods for manufacturing RFID labels, but there remains a need to improve the manufacture of RFID labels, decreasing cost and waste while improving the performance of the label.

BRIEF SUMMARY

The present disclosure is directed to an RFID label, and a method and system for manufacturing same. In one aspect, a method of manufacturing an RFID label includes providing a web structure comprising a dielectric layer and a metal layer; depositing a non-removable resist on the metal layer, the deposition of the non-removable resist defining an antenna; depositing a removable resist on the metal layer, the deposition of the removable resist defining connection pads for connecting an integrated circuit (IC) to the antenna; etching the metal layer to form the antenna and the connection pads; removing the removable resist from the metal layer to expose the connection pads; and attaching the IC to the connection pads.

In another aspect, an RFID label includes a dielectric layer; a metal layer adhered to the dielectric layer, the metal layer comprising an antenna and connection pads; a non-removable resist covering a majority of the antenna but not covering the connection pads; and an IC operably coupled to the connection pads.

In yet another aspect, a system for manufacturing an RFID label includes a printer configured to receive a web structure comprising a dielectric layer and a metal layer; print a non-removable ink resist on the metal layer, the deposition of the non-removable resist defining an antenna; and print a removable ink resist on the metal layer, the deposition of the removable resist defining connection pads for connecting an IC to the antenna; an etching mechanism configured to etch the metal layer to form the antenna and the connection pads; and remove the removable resist from the metal layer to expose the connection pads; and a chip attach mechanism configured to attach the IC to the connection pads.

BRIEF DESCRIPTION OF THE DRAWINGS

The invention of the present disclosure will become more fully understood from the detailed description and the accompanying drawings, wherein.

DETAILED DESCRIPTION

Figure 1:
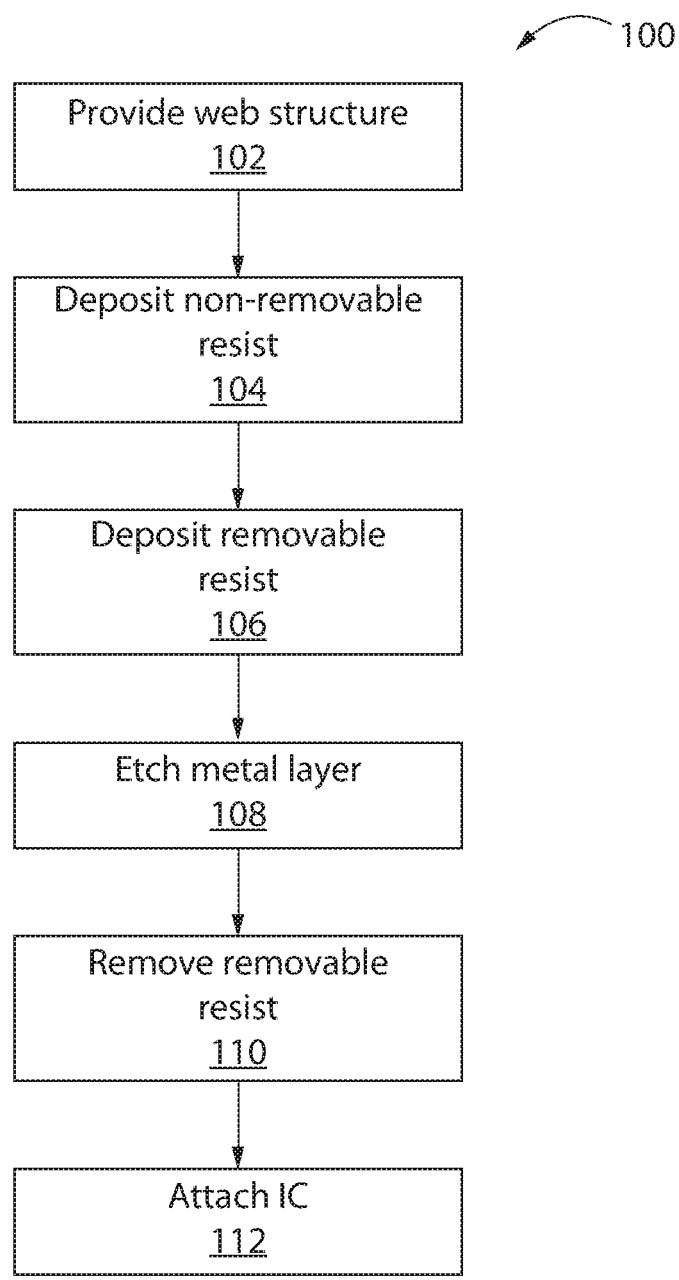
FIG. 1 is a flow chart of a method of manufacturing an RFID label according to one embodiment.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true.

Referring now to FIG. 1, a flow chart of a method 100 of manufacturing an RFID label according to one embodiment is shown. According to this method 100, a web structure is provided (operation 102). The web structure can be any structure that includes a dielectric layer and a metal layer. The metal layer can be any substantially planar layer comprising metal. In a preferred embodiment, the metal layer is a thin aluminum foil. The dielectric layer can be any substantially planar non-conductive layer. In a preferred embodiment, the dielectric layer comprises a polymer film (e.g., polyethylene terephthalate).

Figure 2:
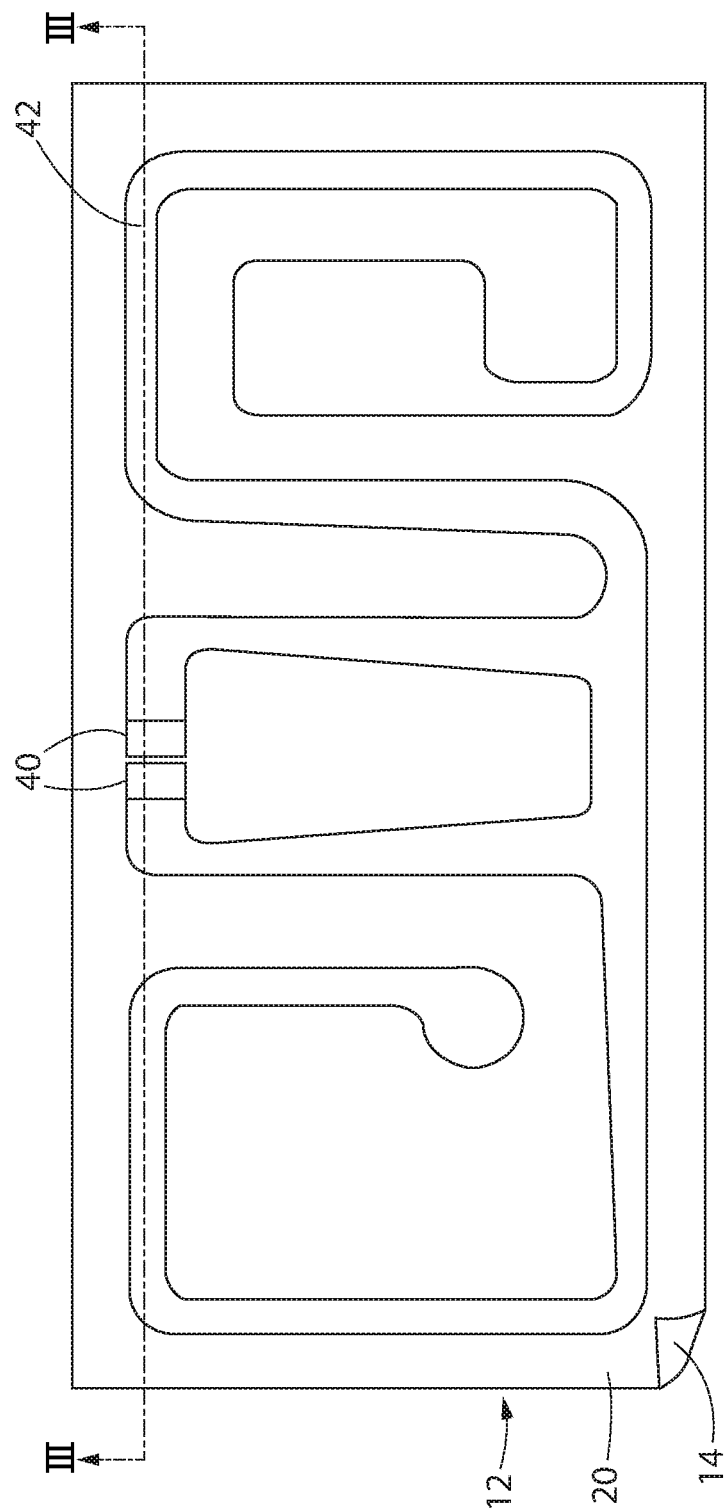
FIG. 2 is a top view of a web structure according to one embodiment, where removable and non-removable resists are applied to a metal layer.
Figure 3:
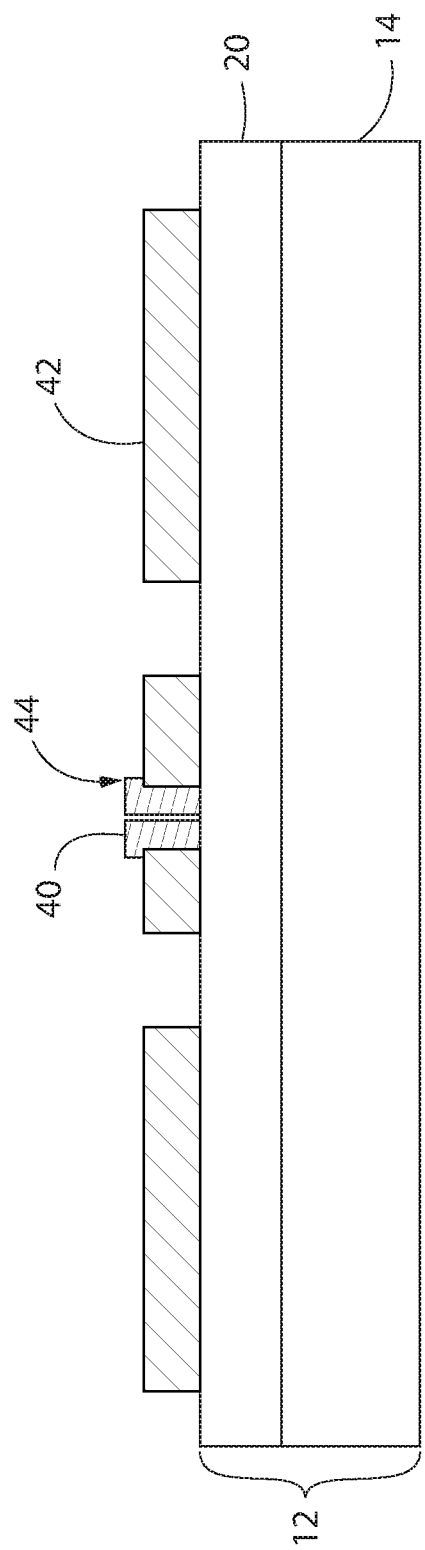
FIG. 3 is a cross-sectional view of the web structure of FIG. 2 taken along line III.

FIGS. 2 and 3 show a web structure 12 according to one embodiment. FIG. 2 shows a top view of the web structure 12, while FIG. 3 shows a cross-sectional view of the web structure 12 taken along line III of FIG. 2. These figures show the web structure 12 including a metal layer 20 and a dielectric layer 14.

The metal layer 20 can be laminated to the dielectric layer 14 using known methods. In one embodiment, the lamination uses urethane-based dry lamination adhesive, which uses a main adhesive and an accelerator. The lamination adhesive can be applied between the metal layer 20 and the dielectric layer 14. Such a lamination adhesive is not shown in the drawings, as it is commonly understood in the art. The exemplified method 100 can also include curing the lamination adhesive. In one example, completion of the chemical reaction to create the necessary bond strength can take 2-3 days at 60 degrees Celsius. In other embodiments, other methods of providing a web structure can be utilized.

Returning to FIG. 1, the exemplified method 100 can further include depositing a non-removable resist on the metal layer, the deposition of the non-removable resist defining an antenna (operation 104). A resist can be any material that is resistant to etching. In one embodiment, etching can be performed by applying an acid, and the resist can be a polymer-based ink that is resistant to acid. The placement of a resist on an area of a metal layer can prevent that area of the metal layer from being etched.

A removable resist has the characteristics of a resist discussed above, and is also removable by a removal substance during the manufacturing process. A removal substance can be any solution, chemical, gas or other substance for removing the removable resist. In one embodiment, the removal substance can be an alkaline solution. Further, the removable resist can comprise vehicle, the vehicle including a first plastic polymer and a solvent, where the vehicle is configured to have a chemical reaction with an alkaline solution (e.g., a NaOH solution). Such a vehicle can include a plastic polymer having an OH base or a COOH base in its microstructure to ensure the chemical reaction. The chemical reaction can cause the removable resist to detach from the metal layer when exposed to an alkaline solution bath, thus exposing the antenna formed from the metal layer.

By contrast, a non-removable resist has the characteristics of a resist discussed above, but is not removable by the removal substance used to remove the removable resist. In one embodiment, the non-removable resist comprises a vehicle including a first plastic polymer and a solvent, but the vehicle is configured to not have a chemical reaction with an alkaline solution. For example, the plastic polymer can be chosen such that it does not have an OH base or a COOH base in its microstructure.

Figure 4A:
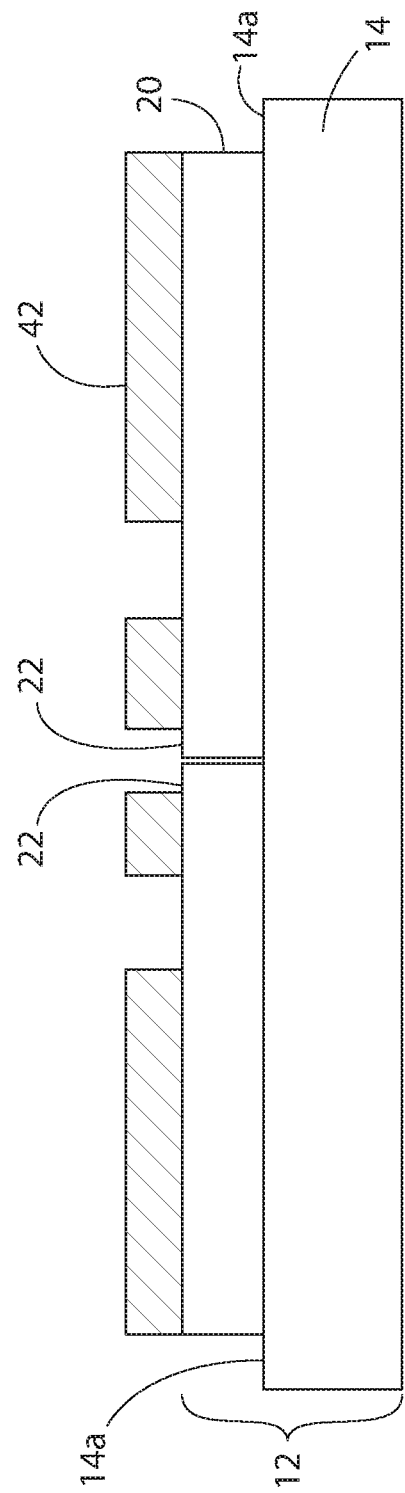
FIG. 4A is a cross-sectional view of the web structure of FIG. 2 taken along line III after etching and removal of the removable resist.
Figure 4B:
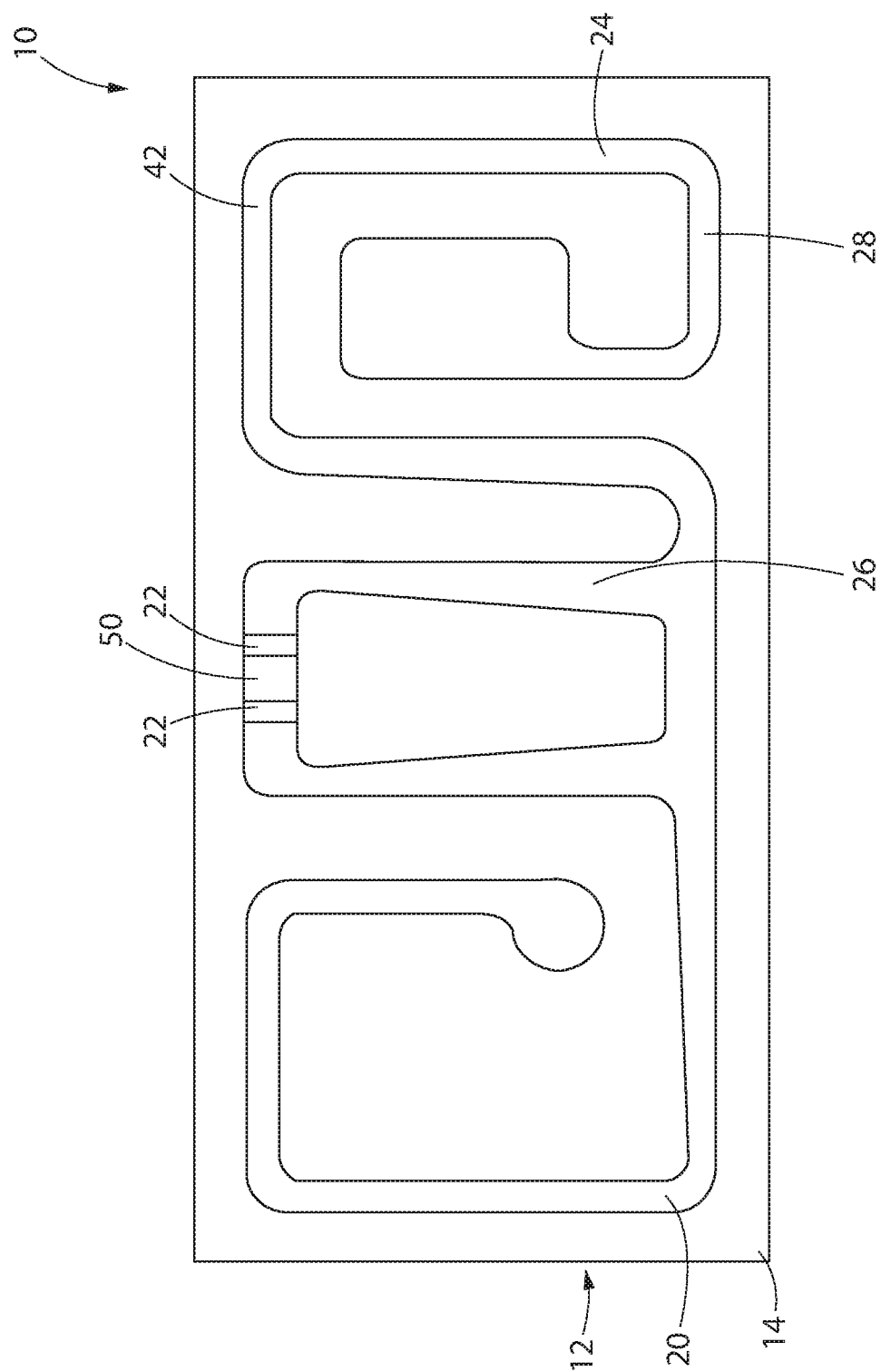
FIG. 4B is a top view of a label according to one embodiment.

FIGS. 2 and 4B help illustrate operation 104 of FIG. 1. FIG. 2 is a top view of a web structure 12 according to one embodiment, where a removable resist 40 and a non-removable resist 42 are deposited upon the metal layer 20. The non-removable resist 42 defines an antenna 24, shown in the resulting label 10 of FIG. 4B. The antenna 24 can be any conductor formed from the metal layer 20 that is configured to send and/or receive signals. In the exemplified embodiment, the antenna 24 is an RFID antenna comprising a far field antenna 28 and a near field antenna 26. The far field antenna 28 is a dipole antenna, and the near field antenna 26 is a loop antenna.

In the exemplified embodiment, the non-removable resist 42 covers the entirety of the antenna 24. In other embodiments, the non-removable resist 42 (or a removable resist that is not removed during manufacturing) can cover any portion of the antenna 24 (e.g., at least 90% of the antenna, a majority of the antenna (greater than 50%), or 25% of the antenna).

Returning to FIG. 1, the exemplified method 100 can further include depositing a removable resist on the metal layer, the deposition of the removable resist defining connection pads for connecting an integrated circuit (IC) to the antenna (operation 106).

FIGS. 2 and 4B help illustrate this operation 106 of FIG. 1. FIG. 2 shows removable resist 40 located to define connection pads 22. FIG. 4B shows a resulting label 10. In this embodiment, each connection pad 22 is directly connected to the near field loop antenna 26. More specifically, the connection pads 22 are connected to arms of the loop antenna 26. In other embodiments, the connection pads 22 can be located anywhere on the antenna 24 sufficient to enable operation of the label 10.

The removable resist 40 can be deposited before or after non-removable resist 42. Further, the resists 40, 42 can be located alongside each other, or can overlap each other. In one embodiment, the deposited removable resist 40 overlaps the deposited non-removable resist 42 (see FIG. 3).

Returning to FIG. 1, the exemplified method 100 can further include etching the metal layer to form the antenna and the connection pads (operation 108). The etching can be performed by any etching substance configured to remove portions of the metal layer. In one embodiment, the etching of the metal layer can include applying an acid to the metal layer, the non-removable resist and the removable resist being acid-resistant. The portions of the metal layer having resist are not etched away by the acid and therefore remain to form the antenna and connection pads. In one embodiment, the acid used for etching is a hydrogen chloride solution. In other embodiments, other etching methods and materials can be used. For example, in one embodiment, plasma etching can be used.

The exemplified method 100 can further include removing the removable resist from the metal layer to expose the connection pads (operation 110). A variety of removal substances can be used depending on the type of removable resist applied. In one embodiment, the removable resist is an ink. As discussed above, the removable resist can comprise a vehicle including a first plastic polymer and a solvent, and the removal of the removable resist can be performed by applying an alkaline solution. In one embodiment, the alkaline solution can be a NaOH solution at 1-2% concentration, this concentration sufficient to remove the removable resist while not compromising the portion of the metal layer forming the connection pads. As discussed above, the alkaline solution or other removal substance can remove the removable resist, while not removing the non-removable resist. Thus, after this operation, the connection pads can be exposed, while the antenna remains covered by the non-removable resist.

The exemplified method 100 can further include attaching an integrated circuit (IC) to the connection pads (operation 112). As chip attachment methods are well known, they are not described in detail herein. This operation can include any method of attaching an IC to the connection pads of an antenna. An example method for attaching an IC to connection pads is described in U.S. Pat. No. 7,569,932 (Rotary Chip Attach) assigned to Checkpoint Systems, Inc.

The exemplified method 100 can include various other steps not discussed above. For example, before the attachment of the IC to the connection pads (or at any stage in the process), the method 100 can include inspecting the web structure using a camera of a CCTV camera system (see FIG. 5). Such camera monitoring can be used to detect defects and ensure consistent orientation, among other things.

Referring again to FIG. 2, this figure shows a top view of the web structure 12 according to one embodiment. The web structure 12 includes a dielectric layer 14 and a metal layer 20. Removable and non-removable resists 40, 42 are deposited on the metal layer 20, the deposition of the non-removable resist 42 defining an antenna, and the deposition of the removable resist 40 defining connection pads.

Referring again to FIG. 3, this figure shows a cross-sectional view of the web structure 12 of FIG. 2 taken along line III. The web structure 12 and its metal layer 20 and dielectric layer 14 are once again shown. Also shown are the removable resist 40 and the non-removable resist 42. This figure also shows an overlap area 44 where the deposited removable resist 40 overlaps the deposited non-removable resist 42. As stated above, in other embodiments the resists 40, 42 can avoid overlapping (e.g., be located side-by-side) or overlap each other in another manner.

FIG. 4A shows a cross-sectional view of the web structure 12 of FIGS. 2 and 3 taken along line III after etching and removal of the removable resist. As can be seen, etching has removed certain portions of the metal layer 20, thereby exposing portions 14*a* of the dielectric layer. Further, the removable resist has been removed to expose the portions of the metal layer 14 forming the connection pads 22.

Referring again to FIG. 4B, this figure shows a top view of a label 10 according to one embodiment. In the exemplified label 10, the etching has been performed and the removable resist has been removed to expose the connection pads 22, thus enabling the connection pads 22 to connect to the IC 50. The non-removable resist 42, however, remains on the label 10. This resist 42 forms the antenna 24, which includes a near field loop antenna 26, and a far field dipole antenna 28. Portions of the dielectric layer 14 of the web structure 12 are exposed by the etching, while the metal layer 20 is covered by the non-removable resist 42.

The exemplified label 10 is configured to be a passive RFID label utilizing modulated backscatter communication. In other embodiments, other RFID technologies can be utilized, including semi-passive RFID.

Figure 5:
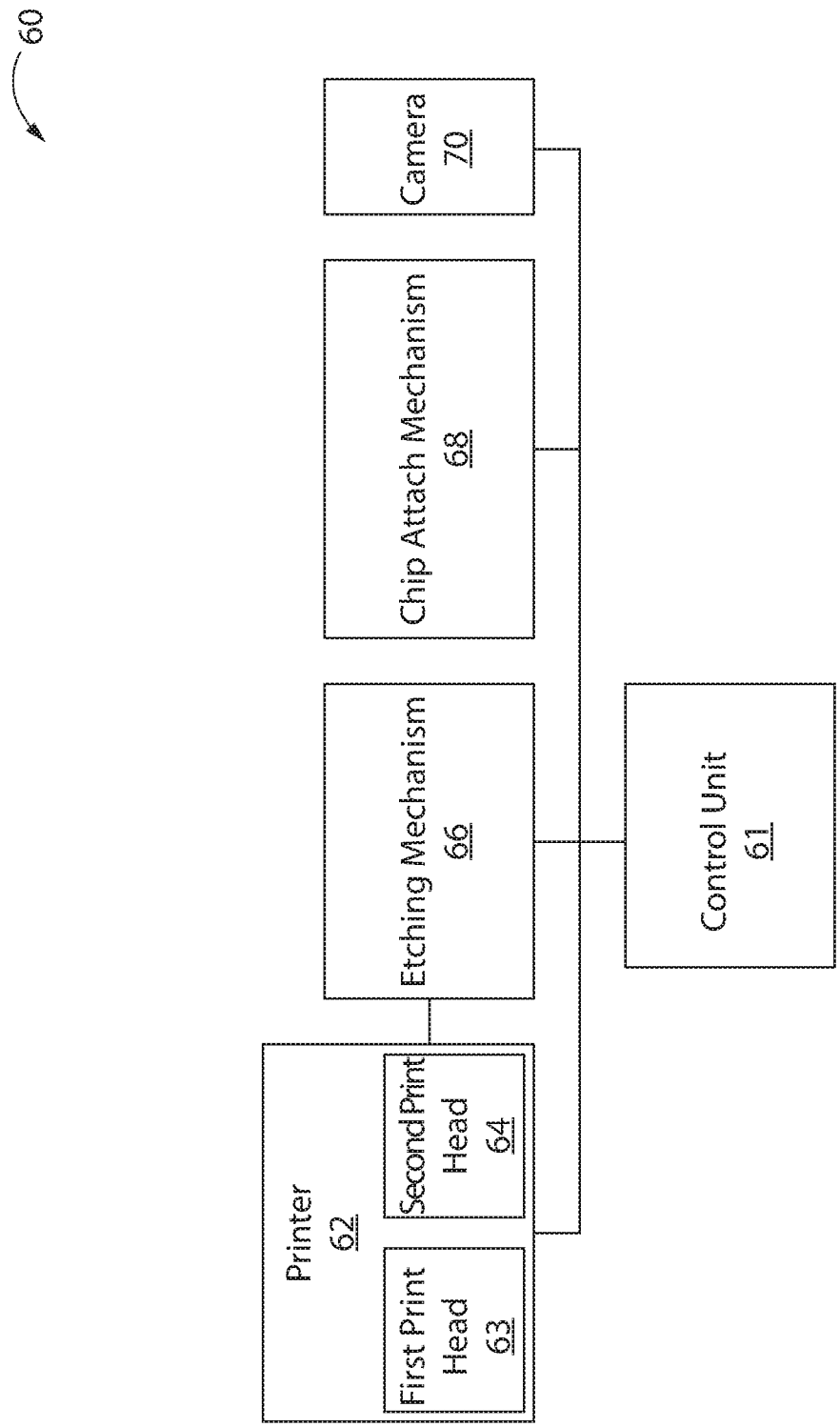
FIG. 5 is a block diagram of a system according to one embodiment.

FIG. 5 is a block diagram of a system 60 for manufacturing an RFID label according to one embodiment. The system 60 includes a printer 62 configured to receive a web structure comprising a dielectric layer and a metal layer; print a non-removable ink resist on the metal layer, the deposition of the non-removable resist defining an antenna; and print a removable ink resist on the metal layer, the deposition of the removable resist defining connection pads for connecting an integrated circuit (IC) to the antenna. In one embodiment, the printer 62 can be a gravure printer having (a) a first print head 63 configured to print the non-removable ink resist and (b) a second print head 64 configured to print the removable ink resist. The printer 62 can use precision registration during the printing process. In other embodiments, other printers for printing ink resists can be used.

The system 60 further includes an etching mechanism 66 configured to etch the metal layer to form the antenna and the connection pads. The etching mechanism can include a container and/or dispenser for an acid solution. The etching mechanism can be further configured to remove the removable resist from the metal layer to expose the connection pads. Thus, the etching mechanism can further include a container and/or dispenser for an alkaline solution or other removal substance.

The system 60 further includes a chip attach mechanism 68 configured to attach the IC to the connection pads. As chip attachment methods are well known, they are not described in detail herein. The chip attach mechanism 68 can use any method of attaching an IC to the connection pads of an antenna. An example method for attaching an IC to connection pads is described in U.S. Pat. No. 7,569,932 (Rotary Chip Attach) assigned to Checkpoint Systems, Inc.

The system 60 can further include a camera 70 for inspecting the web structure. The camera 70 can form part of a CCTV camera system. Such camera monitoring can be used to detect defects and ensure consistent orientation, among other things. In other embodiments, the camera 70 can be omitted.

The system 60 can further include a control unit 61 for controlling the printer 62, etching mechanism 66, chip attach mechanism 68, camera 70, and other components of the manufacturing system 60. The control unit can use a standard processor and/or standard computer components for sending and receiving signals and data to control the components. Such control can include controlling the rate of printing and etching, altering the type of IC to be attached, and controlling the types of defects the camera is monitoring and how the system 60 responds to such defects.

Typical RFID manufacturing processes remove all or most resist from a web structure after etching the antenna and connection pads. The embodiments of the present disclosure, however, keep non-removable resist over the antenna of the label. This approach provides several advantages. First, such an approach can cut costs by increasing etching speed, in some cases by 25% compared to conventional etching processes. Typically, etching and resist removal are carried out by one machine or system, and resist removal is the more time-consuming process of the two. When resist removal is slow, etching is slowed, causing the acid residual (or other residual from etching) on the web structure to continue to degrade the metal layer, causing so-called "over etching." By limiting the resist removal required, resist removal occurs more quickly, limiting the time that any acid residual can over-etch the metal layer. Faster resist removal also increases overall etching speed, therefore reducing operation costs.

Further, the non-removable resist can protect the antenna from scratching during the manufacturing process, and from metal oxidation occurring during or after manufacturing. Further, non-removable ink can have strong resistance to etching, leading to a more reliable antenna etching. By contrast, removable resist, such as ink removable by alkaline, can have a weaker resistance to acid etching.

Further, the disclosed embodiments can enable a more environmentally-friendly label manufacturing process. The waste caused by removed ink is almost entirely eliminated. This also reduces the use of water and chemicals during post-waste treatment.

Further, in typical RFID manufacturing processes, use of an NaOH solution to remove ink causes air bubbling. Special tools must be used to address this issue. The disclosed embodiments, however, decrease the amount of ink or other resist removed, thus eliminating the need for special tools to address air bubbling.

While the various example embodiments have been described with respect to specific examples, those skilled in the art will appreciate that there are numerous variations and permutations of the above that may be implemented without departing from the scope of the present invention. Also, it is to be understood that other embodiments may be utilized and structural and functional modifications may be made without departing from the scope of the present invention. Thus, the spirit and scope should be construed broadly as set forth in the appended claims.

What is claimed is:

1. An RFID label comprising:
a dielectric layer;
a metal layer adhered to the dielectric layer, the metal layer comprising an antenna and connection pads;
a removable resist operatively defining the connection pads wherein the removable resist is selected from a material that is removable upon exposure to a removal substance;

a non-removable resist defining the antenna wherein the non-removable resist is selected from a material that remains on the antenna after exposure to a removal substance; and an IC operably coupled to the connection pads.

2. The RFID label of claim 1, wherein the removal substance is an alkaline solution.

3. The RFID label of claim 1 wherein the non-removable resist covers the entirety of the antenna.

4. The RFID label of claim 1 wherein the non-removable resist covers at least 90% of the antenna.

5. The RFID label of claim 1 wherein the non-removable resist is acid-resistant.

6. The RFID label of claim 5 wherein the non-removable resist comprises a vehicle including a first plastic polymer and a solvent, the vehicle configured to not have a chemical reaction with an alkaline solution.

\* \* \* \* \*